US010000154B2

(12) United States Patent
Schondorf et al.

(10) Patent No.: US 10,000,154 B2
(45) Date of Patent: Jun. 19, 2018

(54) VEHICLE CAMERA SYSTEM HAVING LIVE VIDEO INDICATION

(71) Applicant: Ford Global Technologies, LLC, Dearborn, MI (US)

(72) Inventors: Steven Yellin Schondorf, Dearborn, MI (US); Maher Ghneim, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 692 days.

(21) Appl. No.: 14/454,306

(22) Filed: Aug. 7, 2014

(65) Prior Publication Data

US 2016/0039341 A1    Feb. 11, 2016

(51) Int. Cl.
| | |
|---|---|
| H04N 5/272 | (2006.01) |
| B60R 1/00 | (2006.01) |
| G09G 5/14 | (2006.01) |
| H04N 5/265 | (2006.01) |

(52) U.S. Cl.
CPC ............... *B60R 1/00* (2013.01); *G09G 5/14* (2013.01); *H04N 5/272* (2013.01); *B60R 2300/207* (2013.01); *B60R 2300/301* (2013.01); *B60R 2300/305* (2013.01); *B60R 2300/70* (2013.01); *B60R 2300/8066* (2013.01); *B60R 2300/8093* (2013.01); *G09G 2340/10* (2013.01); *G09G 2370/20* (2013.01); *H04N 5/265* (2013.01)

(58) Field of Classification Search
None
See application file for complete search history.

(56) References Cited

U.S. PATENT DOCUMENTS

| | | |
|---|---|---|
| 5,946,445 A | 8/1999 | Peters et al. |
| 8,334,879 B2 | 12/2012 | Krajec |
| 8,427,288 B2 | 4/2013 | Schofield et al. |
| 8,456,571 B1 | 6/2013 | Taylor et al. |
| 8,477,228 B2 | 7/2013 | Stallings et al. |
| 9,117,123 B2 * | 8/2015 | Nix ..................... G06K 9/00845 |
| 2002/0054750 A1 | 5/2002 | Ficco et al. |
| 2006/0018207 A1 * | 1/2006 | Saito .................. H04N 5/23293 369/30.01 |
| 2007/0058647 A1 * | 3/2007 | Bettis .................. H04L 12/5835 370/401 |
| 2007/0240071 A1 * | 10/2007 | Sherrill .............. G05B 23/0267 715/764 |
| 2010/0091036 A1 | 4/2010 | Wright et al. |
| 2012/0002051 A1 | 1/2012 | Nix |
| 2013/0088343 A1 | 4/2013 | Deigmoeller et al. |
| 2014/0125802 A1 | 5/2014 | Beckert et al. |

* cited by examiner

*Primary Examiner* — Jay Au Patel
*Assistant Examiner* — Shadan E Haghani
(74) *Attorney, Agent, or Firm* — Frank A. MacKenzie; Brooks Kushman P.C.

(57) ABSTRACT

A vehicle display displays a camera video having an indicator. The indicator is static on the display while the camera video is frozen on the display thereby notifying a viewer that the camera video is frozen and the indicator is dynamic on the display while the camera video is live on the display.

20 Claims, 3 Drawing Sheets

US 10,000,154 B2

VEHICLE CAMERA SYSTEM HAVING LIVE VIDEO INDICATION

TECHNICAL FIELD

This disclosure relates to vehicle rear view or backup cameras.

BACKGROUND

A vehicle rear view camera enables the driver to see what is behind the vehicle, particularly when the vehicle is shifted in reverse. The camera is typically mounted in the rear of the vehicle and has a rearward facing field of view. The camera generates a video of the area behind the vehicle viewed by the camera. A display inside the vehicle displays the video for the driver to view.

A failure mode may result in the video being frozen on the display. The video may freeze with a frozen image displayed on the display without any warning notifying the driver that the image is frozen. In such an event, it may be difficult for the driver to distinguish between a frozen image and a live video of a static environment. This is particularly problematic when the video freezes while no obstacles are present behind the vehicle and then an obstacle subsequently enters the area behind the vehicle. In this case, the obstacle will not be displayed on the display. The driver viewing the frozen image will therefore not see the obstacle on the display and may proceed with the vehicle backup maneuver.

SUMMARY

An embodiment of the present invention provides a method for a vehicle. The method includes displaying on a display a camera video having an indicator. The indicator is static on the display in response to the camera video being frozen on the display thereby notifying a viewer that the camera video is frozen and the indicator is dynamic on the display in response to the camera video being live on the display.

An embodiment of the present invention provides a camera system for a vehicle. The system includes a display configured to display a camera video having an indicator. The indicator is static on the display in response to the camera video being frozen on the display thereby notifying a viewer that the camera video is frozen. The indicator is dynamic on the display in response to the camera video being live on the display.

An embodiment of the present invention provides another camera system for a vehicle. This system includes a display and a video combiner. The video combiner is configured to combine a camera video and an indication video to form a combined video. The indication video has an indicator set to be dynamic on the display in response to the combined video being live on the display. The indicator is set to be static on the display in response to the combined video being frozen on the display thereby notifying a viewer of the display that the camera video is frozen.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
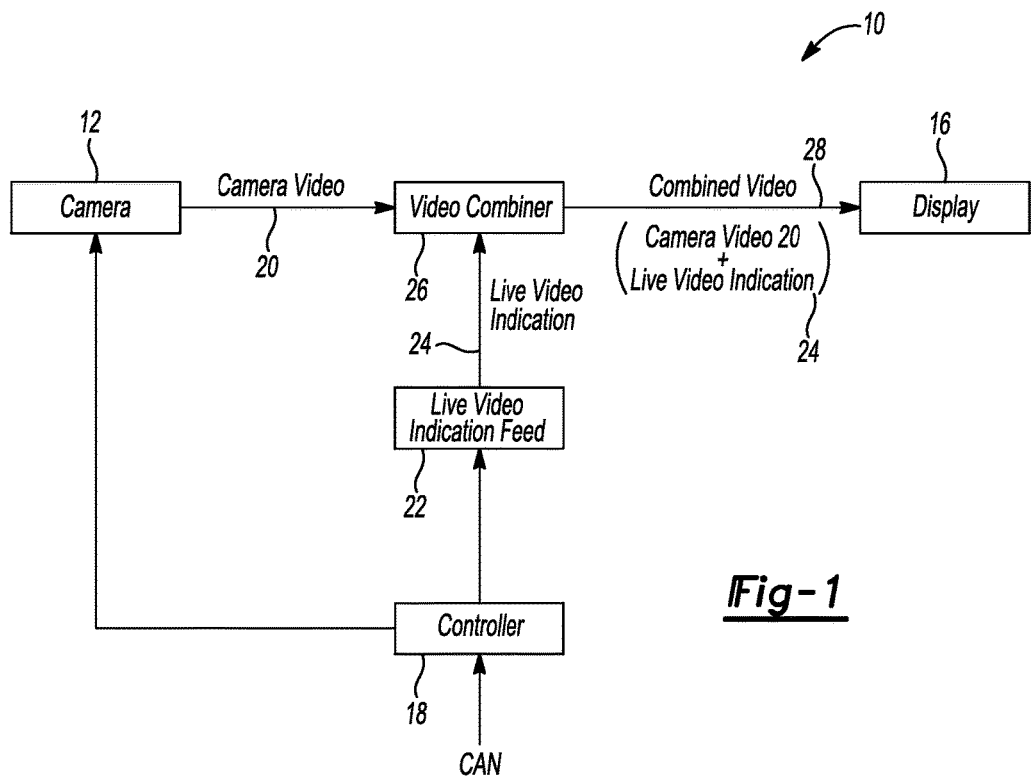
FIG. 1 illustrates a block diagram of a camera system in accordance with an embodiment of the present invention.

Referring now to FIG. 1, a block diagram of a camera system 10 in accordance with an embodiment of the present invention is shown. In this embodiment, camera system 10 is a camera system for a vehicle. However, camera system 10 may be a camera system for other non-vehicle environments. In this particular embodiment, camera system 10 is a rear view vehicle camera system.

Camera system 10 includes a camera (i.e., an imager) 12 and a display 16. Camera 12 is a vehicle rear view or backup camera. Camera 12 is mounted in the rear of the vehicle and has a rearward facing field of view. Camera 12 generates a camera video 20 of the area behind the vehicle viewed by the camera.

As described in greater detail below, camera video 20 is provided to display 16. Display 16 is viewable by a user such as a driver of the vehicle and displays camera video 20 for the driver to view. For instance, display 16 is mounted in the center console, incorporated into the interior rear view mirror and/or side mirror(s), or placed in some other location inside the vehicle cabin visible to the driver. The driver viewing camera video 20 on display 16 is therefore able to see the area behind the vehicle.

Camera system 10 further includes a live video indication feed 22. Live video indication feed 22 is configured to generate a live video indication 24. Live video indication 24 is a video having some type of "indicator" that is dynamic (e.g., changes) in some manner while the live video indication is displayed on a display and is live (i.e., not frozen). The indicator may be an overlay, a symbol, graphics, a display border element, etc. The indicator changes while live video indication 24 is live on the display such as by, for instance, moving along or around at least a portion of the display, changing its color, brightness, or size on the display, etc. Conversely, the indicator is static (e.g., stays unchanged) while live video indication 24 is frozen on the display.

Live video indication feed 22 is a separate component from camera 12 and live video indication 24 is a second video in addition to camera video 20. As such, camera video 20 and live video indication 24 are two separate videos.

Camera system 10 further includes a video combiner 26. Video combiner 26 receives camera video 20 from camera 12 and live video indication 24 from live video indication feed 22. Video combiner 26 combines camera video 20 and live video indication 24 to form a combined video 28. Combined video 28 therefore includes two video components: camera video 20 and live video indication 24. In this regard, video combiner 26 forms combined video 28 by overlaying live video indication 24 onto camera video 20. Video combiner 26 provides combined video 28 to display 16.

Display 16 displays combined video 28 for the driver to view. As such, display 16 displays concurrently together camera video 20 and live video indication 24. That is, display 16 displays camera video 20 with live video indication 24 overlaid thereon. The driver viewing combined video 28 on display 16 is therefore able to view camera video 20 and see the area behind the vehicle. The driver viewing combined video 28 on display 16 is also able to view live video indication 24 and view the indicator of the live video indication on the display. Again, the indicator of live video indication 24 changes in some manner noticeable to the driver viewing display 16 while the live video indication is live on the display. Conversely, the indicator stays unchanged while live video indication 24 is frozen on display 16.

Camera system 10 may further include a controller 18 configured to control the operation of camera 12 and live video indication feed 22. For instance, controller 18 is configured to turn on camera 12 and live video indication feed 22 upon the vehicle being shifted into reverse. Controller 18 may receive CAN bus signal or the like to be made aware of when the vehicle is shifted into reverse.

As indicated above, a failure mode may result in the video displayed on display 16 being frozen. Display 16 displays a frozen image of the video while the video is frozen. As further indicated above, this is problematic if the driver is not provided with notification that the video displayed on display 16 is frozen and that the driver is viewing a frozen image of the video. Without such notification, the driver may erroneously believe that the frozen image is a live video of a static environment.

Figure 2A:
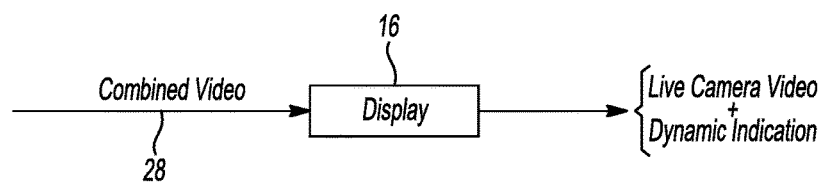
FIG. 2A illustrates a block diagram of the display output of the camera system during proper operation.

Referring now to FIG. 2A, with continual reference to FIG. 1, a block diagram of the display output of camera system 10 during proper operation is shown. In operation, display 16 receives combined video 28 and displays the combined video for the driver to view. Combined video 28 includes camera video 20 and live video indication 24. As such, display 16 displays both camera video 20 and live video indication 24. During proper operation (e.g., when no failure mode is present), camera video 20 and live video indication 24 are both live videos. That is, neither of camera video 20 or live video indication 24 are frozen videos. Therefore, the display output of display 16 during proper operation includes combined live versions of camera video 20 and live video indication 24 as indicated in FIG. 2A.

As camera video 20 displayed as part of combined video 28 on display 16 is live, the camera video is a live video of the area behind the vehicle for the driver to view on the display. Likewise, as live video indication 24 displayed as part of combined video 28 on display 16 is live, the indicator of the live video indication changes in some manner noticeable to the driver viewing the display. That is, the indicator is a live indicator as it changes in some manner on display 16 while live video indication 24 is live. Live video indication 24 is live when camera video 20 is live. Therefore, the driver viewing camera video 20 on display 16 will be made aware the camera video is live on the display by seeing the indicator of live video indication 24 also displayed on the display changing while combined video 28 is being displayed on the display.

As noted, live video indication 24 is live on display 16 when camera video 20 is live on the display. On the other hand, live video indication 24 is frozen on display 16 when camera video 20 is frozen on the display. When live video indication 24 is frozen, the indicator of live video indication is also frozen. That is, the indicator of live video indication 24 is a static or frozen indicator displayed on display 16 and does not change at all while the live video indication is frozen (which as noted occurs when camera video 20 is frozen). Therefore, the driver viewing camera video 20 on display 16 will be made aware the camera video is frozen on the display by seeing the indicator of live video indication 24 also displayed on the display not changing. This is described in greater detail with reference to FIG. 2B.

Figure 2B:
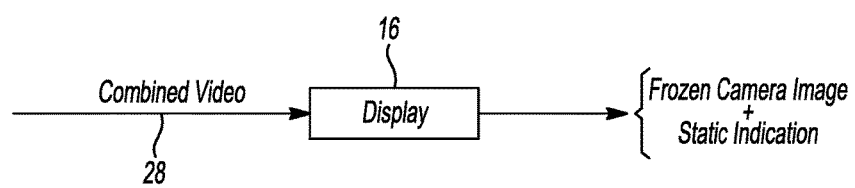
FIG. 2B illustrates a block diagram of the display output of the camera system during operation when a failure mode is present and the displayed video freezes.

Referring now to FIG. 2B, with continual reference to FIG. 1, a block diagram of the display output of camera system 10 during operation when a failure mode is present and the displayed combined video 28 freezes is shown. Again, in operation, display 16 receives combined video 28 including camera video 20 and live video indication 24 and displays the combined video for the driver to view. The failure mode is assumed to result in combined video 28 displayed on display 16 being frozen. Camera video 20 and live video indication 24 are thereby both frozen videos and display 16 displays a frozen image of the camera video with a frozen image of the live video indication overlaid thereon. Therefore, the display output of display 16 when the failure mode is present includes combined frozen images of camera video 20 and live video indication 24 as indicated in FIG. 2B.

As live video indication 24 displayed as part of combined video 28 on display 16 is frozen, the indicator of the live video indication does not change and remains fixed in place. That is, the indicator is a frozen indicator as it does not change while live video indication 24 is frozen. Again, live video indication 24 is frozen when camera video 20 is frozen. Therefore, the driver viewing camera video 20 on display 16 will be made aware the camera video is frozen by seeing the indicator of live video indication 24 also displayed on the display also being frozen. With this notification, the driver will be made aware that the frozen camera image on display 16 is not a live video of a static environment.

Figure 3A:
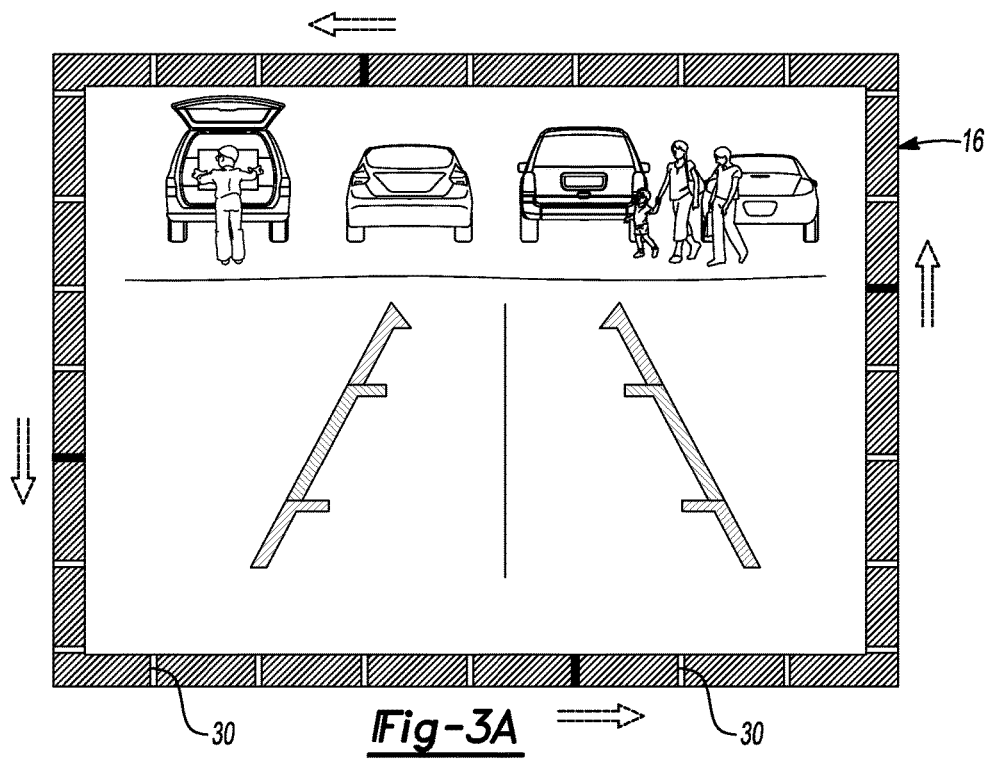
FIG. 3A illustrates an example view of the display output of the camera system in which the live indicator overlaid onto the camera video is an exemplary movable screen border element.
Figure 3B:
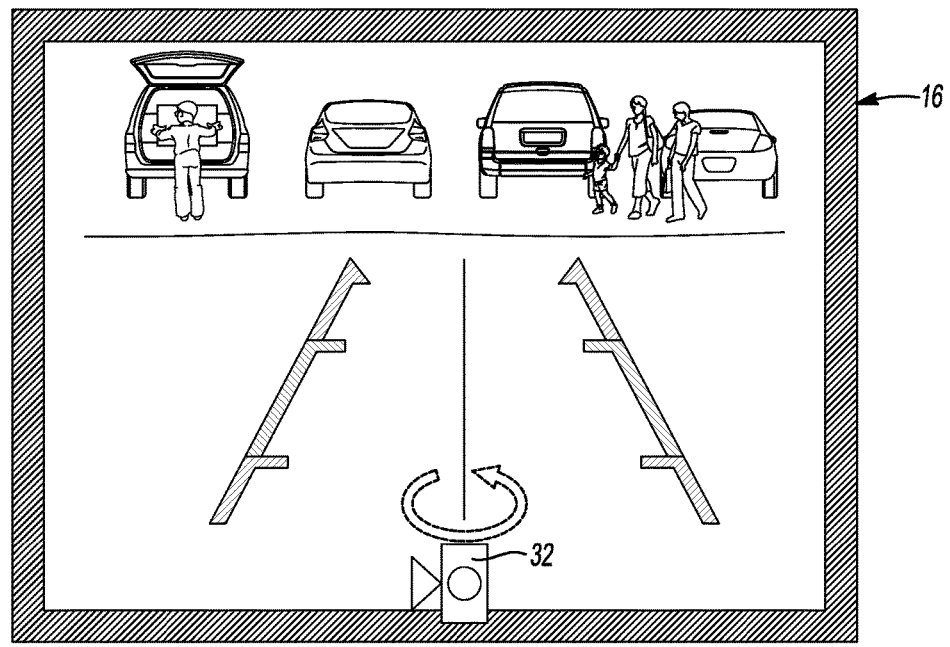
FIG. 3B illustrates the example view of the display output of the camera system in which the live indicator overlaid onto the camera video is an exemplary movable icon.
Figure 3C:
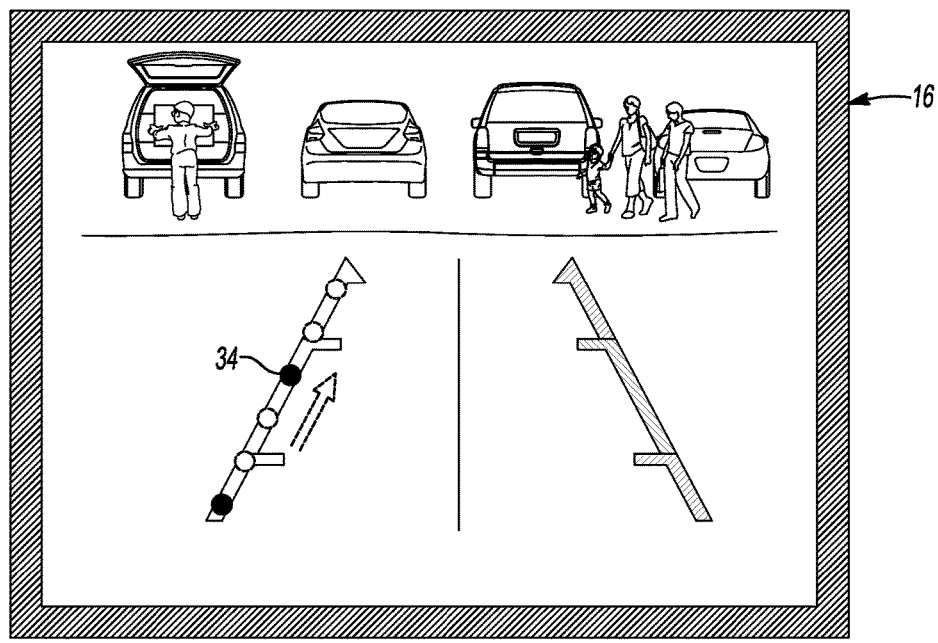
FIG. 3C illustrates the example view of the display output of the camera system in which the live indicator overlaid onto the camera video is an exemplary movable graphic element.

Referring now to FIGS. 3A, 3B, and 3C, an example view of the display output of camera system 10 is shown. As described, display 16 displays the display output of camera system 10. The display output includes combined video 28 including camera video 20 and live video indication 24. Live video indication 24 includes the live indicator.

In FIG. 3A, the live indicator overlaid onto camera video 20 is an exemplary movable screen border element 30. For instance, screen border element 30 is one or more colored line segments which march slowly around the screen border while combined video 28 is live. As such, screen border element 30 moving around the screen border provides an indication that camera video 20 is live. On the other hand, screen border element 30 is frozen and stays fixed in place while camera video 20 is frozen.

In FIG. 3B, the live indicator overlaid onto camera video 20 is an exemplary moving icon 32. For instance, moving icon 32 includes a radar sweep line that turns slowly around inside while combined video 28 is live. As such, icon 32 turning around inside provides an indication that camera video 20 is live. On the other hand, icon 32 is frozen and stays fixed in place while camera video 20 is frozen.

In FIG. 3C, the live indicator overlaid onto camera video 20 is an exemplary movable graphic element 34. For instance, graphic element 34 is a colored dot which slides slowly up and down overlay bars of the display while combined video 28 is live. Thus, graphic element 34 moving about the display provides an indication that camera video 20 is live. On the other hand, graphic element 34 is frozen and stays fixed in place while camera video 20 is frozen.

Of course, the versions of the indicator shown in FIGS. 3A, 3B, and 3C are exemplary graphics and numerous other types of graphics and the like may be employed. Again, in general, the indicator is a moving overlay injected into camera video 20 to indicate to the driver that the camera video feed is live.

In embodiment of camera system 10 described above, live video indication feed 22 is a separate component from camera 12 as shown in FIG. 1. In this embodiment, camera system 10 includes video combiner 26 which combines camera video 20 and live video indication 24 separately received from camera 12 and live video indication feed 22, respectively, to form combined video 28. As further described, in this embodiment, combined video 28 displayed on display 16 is frozen when the display displays a frozen image even though the feed from camera 12 and live video indication feed 22 are active and video combiner 26 is functioning properly. Similarly, as further described, in this embodiment, combined video 28 displayed on display 16 is frozen when video combiner 26 freezes even though the feed from camera 12 and live video indication feed 22 are active.

Figure 4:
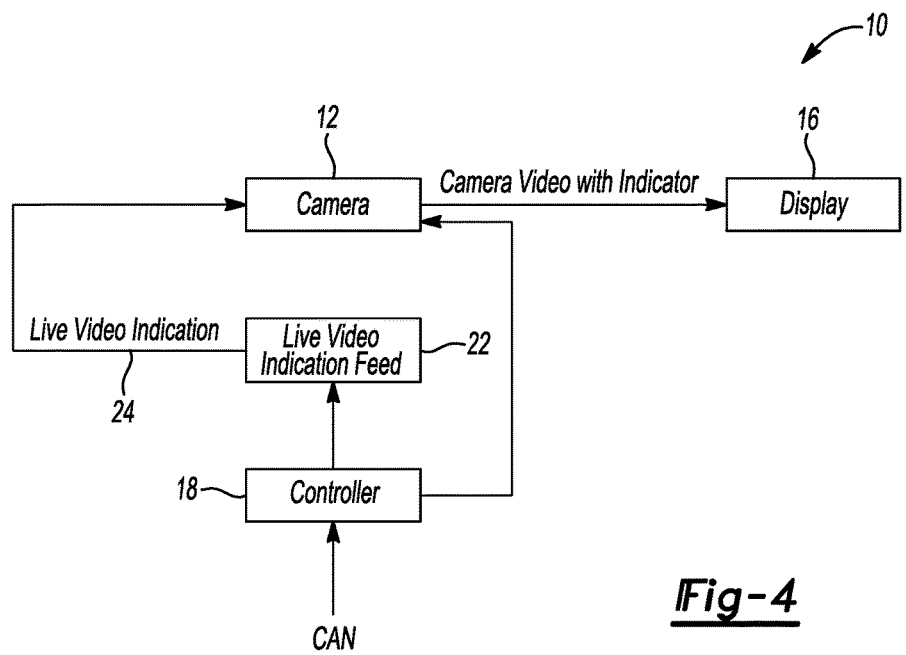
FIG. 4 illustrates a block diagram of the camera system in accordance with another embodiment of the present invention.

In other embodiments of camera system 10 such as shown in FIG. 4, live video indication 24 is injected into camera video 20 at camera 12 (i.e., upstream of video combiner 26) such as by being injected upstream of the imager of the camera or directly into the output stream of the imager of the camera. As such, these embodiments do not include video combiner 26 as the output stream of camera 12 is camera video 20 including live video indication 24 (e.g., a camera video having an indicator).

It is further noted that any and all elements of camera system 10 as shown in FIGS. 1 and 4 may be physically incorporated as part of camera 12 as opposed to being physically separate from camera 12 as shown in FIGS. 1 and 4.

As described, a camera system 10 in accordance with embodiments of the present invention solves the problem of a frozen camera video displayed on a display by injecting a moving indicator into the live camera video feed. As such, the driver will expect to see something moving (e.g., the indicator) in the camera video displayed on the display when the displayed camera video is live. When the camera video freezes on the display the live feed indicator also freezes on the display by definition. The frozen indicator provides notice to the driver viewing the display that the camera video displayed on the display is not a live video feed. The driver will then be able to take appropriate countermeasures to deal with the frozen camera video displayed on the display.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for a vehicle, comprising:
displaying on a display a camera video having an indicator, wherein the indicator is static on the display and fixed at a location on the display when the camera video is frozen on the display thereby notifying a viewer that the camera video is frozen and the indicator is dynamic on the display by moving between locations on the display when the camera video is live on the display.

2. The method of claim 1 wherein:
the indicator is dynamic on the display when the camera video is live on the display further by at least one of the indicator moving along or around at least a portion of the display, a color of the indicator changing, a size of the indicator changing, and a brightness of the indicator changing.

3. The method of claim 1 wherein:
the indicator is at least one of an overlay, a symbol, an icon, a graphic element, and a border element.

4. The method of claim 1 further comprising:
providing the camera video by a camera of the vehicle.

5. The method of claim 4 wherein:
the camera is a rear view camera of the vehicle.

6. The method of claim 1 further comprising:
providing an indicator video having the indicator by a live video indication feed.

7. The method of claim 1 further comprising:
combining the camera video and the indicator prior to displaying the camera video having the indicator.

8. The method of claim 1 further comprising:
providing the camera video by a camera of the vehicle;
providing an indication video having the indicator by a live video indication feed; and
enabling the camera to provide the camera video and the live video indication feed to provide the indicator upon the vehicle being shifted rearward and otherwise disabling the camera and the live video indication feed.

9. A camera system for a vehicle, comprising:
a display configured to display a camera video having an indicator, wherein the indicator is static on the display and remains fixed at a location on the display in response to the camera video being frozen on the display thereby notifying a viewer that the camera video is frozen and the indicator is dynamic on the display by moving between locations on the display in response to the camera video being live on the display.

10. The system of claim 9 wherein:
the indicator is dynamic on the display in response to the camera video being live on the display further by at least one of the indicator moving along or around at least a portion of the display, a color of the indicator changing, a size of the indicator changing, and a brightness of the indicator changing.

11. The system of claim 9 wherein:
the indicator is at least one of an overlay, a symbol, an icon, a graphic element, and a border element.

12. The system of claim 9 wherein:
the display is a rear view display of the vehicle.

13. The system of claim 9 further comprising:
a rear view camera configured to provide the camera video.

14. A camera system for a vehicle, comprising:
a display; and
a video combiner configured to combine a camera video and an indication video to form a combined video, the indication video having an indicator set to be dynamic on the display by moving between locations on the display in response to the combined video being live on the display, and set to be static on the display and remain fixed at a location on the display in response to the combined video being frozen on the display thereby notifying a viewer of the display that the camera video is frozen.

15. The system of claim 14 wherein:
the indicator is dynamic on the display in response to the camera video being live on the display further by at least one of the indicator moving along or around at least a portion of the display, a color of the indicator changing, a size of the indicator changing, and a brightness of the indicator changing.

16. The system of claim 14 wherein:
the indicator is at least one of an overlay, a symbol, an icon, a graphic element, and a border element.

17. The system of claim 14 further comprising:
a camera configured to provide the camera video to the video combiner, wherein the camera video is a surrounding of the vehicle; and
a live video indication feed configured to provide the indication video having the indicator to the video combiner.

18. The system of claim 17 wherein:
the camera is a rear view camera.

19. The system of claim 17 wherein:
the live video indication feed is independent of the camera.

20. The system of claim 17 further comprising:
a controller configured to enable the camera to provide the camera video and the live video indication feed to provide the indication video upon the vehicle being shifted rearward.

* * * * *